United States Patent
Roger

[11] 3,906,495
[45]* Sept. 16, 1975

[54] RADAR SYSTEM FOR DETECTING LOW-FLYING OBJECTS

[75] Inventor: Joseph Roger, Paris, France

[73] Assignee: Thomson-CSF, Paris, France

[ * ] Notice: The portion of the term of this patent subsequent to Dec. 11, 1990, has been disclaimed.

[22] Filed: Jan. 24, 1973

[21] Appl. No.: 326,551

Related U.S. Application Data

[63] Continuation-in-part of Ser. No. 173,818, Aug. 23, 1971, Pat. No. 3,778,824.

[30] Foreign Application Priority Data

Aug. 21, 1970 France .............................. 70.30702

[52] U.S. Cl. .............................. 343/7 A; 343/16 M
[51] Int. Cl.² ............................................ G01S 9/22
[58] Field of Search .......................... 343/7 A, 16 M

[56] References Cited
UNITED STATES PATENTS

| | | | |
|---|---|---|---|
| 2,784,400 | 3/1957 | Ehrenfried ........................ | 343/16 M |
| 3,283,322 | 11/1966 | Hovda et al. ..................... | 343/16 M |
| 3,353,180 | 11/1967 | Anderson .......................... | 343/16 M |
| 3,396,395 | 8/1968 | Ball et al. ......................... | 343/16 M |
| 3,495,246 | 2/1970 | Schoneborn ...................... | 343/16 M |
| 3,560,974 | 2/1971 | Lecourtier et al. .............. | 343/16 M |
| 3,680,102 | 7/1972 | Poinsard .......................... | 343/16 M |

*Primary Examiner*—Malcolm F. Hubler
*Attorney, Agent, or Firm*—Karl F. Ross; Herbert Dubno

[57] ABSTRACT

A transceiver of a radar station is linked with an antenna, including two vertically spaced radiators, via two branch paths merging into a sum channel and a difference channel for passing microwave energy from the transceiver to the radiators, or vice versa, in additive and subtractive phase relationship. By alternately blocking these channels during transmission and/or reception, or by introducing a phase shift into one or both branch paths, it is possible to determine which mode of operation delivers a signal of maximum strength from a detected target in one of the channels. In some instances, periodic switchover or phase reversal during surveillance automatically leads to the selection of the more active channels or the more favorable phasing as soon as an echo signal is detected; in another embodiment, in which the two branch paths include a pair of cascaded 3-db couplers common to both channels, the phase is progressively readjusted in response to an echo signal in the difference channel to maximize the output of the sum channel.

7 Claims, 10 Drawing Figures

RADAR SYSTEM FOR DETECTING LOW-FLYING OBJECTS

CROSS-REFERENCE TO RELATED APPLICATION

This application is a continuation-in-part of my copending application Ser. No. 173,818 filed Aug. 23, 1971, now U.S. Pat. No. 3,778,824.

FIELD OF THE INVENTION

My present invention relates to a radar system, more specifically to a system designed to detect low-flying aircraft and other low-altitude objects.

BACKGROUND OF THE INVENTION

The coverage of a monitoring radar may be defined as the air space effectively surveyed in the vertical plane. This coverage, expressed for example in square kilometers, depends on various parameters including the coefficient of reflection of the ground (soil or water) if the objects to be detected are at low elevation above the earth's surface.

If ground reflection is significant, energy transmitted and/or received directly across free space will combine in the receiver with energy reflected at the surface, the two constituent signals bearing a phase relationship which is a function of the angular elevation of the reflecting object and may vary between 0 and $\pi$ for small angular increments; thus, within a given vertical plane corresponding to a chosen azimuthal direction, the radiation pattern may have several lobes and gaps within a relatively narrow angular range.

Various solutions have been proposed for remedying this inconvenience. These solutions generally involve rather costly alterations as well as a reduction in signal strength due to suppression of the ground wave reflected on the surface.

OBJECT OF THE INVENTION

The general object of my invention is to provide an improved radar system, and a method of operating such system, which eliminates these drawbacks and effectively utilizes both the free-space wave and the ground wave in detecting low-flying aircraft and the like.

SUMMARY OF THE INVENTION

In accordance with this invention, an antenna for sending out microwave energy during a transmitting interval and intercepting returning echoes thereof during a receiving interval includes two vertical spaced radiators, used during transmission and/or reception, to create two distinct energy components traveling slightly different routes during transmission and/or reception so as to differ significantly in phase and or amplitude, at least for some elevational angles, upon returning to the antenna for the energization of a load such as, for example, a panoramic display indicator. These two radiators, preferably disposed in the same azimuthal plane, are the terminal points of two branch paths leading to an associated transceiver, these branch paths merging into a sum channel for additively combining the two energy components and into a difference channel for subtractively combining same. Depending on the relative phase shift and attenuation which these components experience on traveling to and from the target, one or the other of these channels carries a stronger echo signal; the signal amplitudes of the two channels vary in complementary fashion with different angles of elevation, thereby enabling the selection of the more strongly energized channel for energizing the load. By modifying the transmission characteristics of at least one of the branch paths, and by monitoring the strength of incoming signals due to returning echoes from a single target with different adjustments of these characteristics, I am able to determine which mode of operation delivers a signal of maximum strength in one of the two channels and, consequently, to maintain (for this particular target) an adjustment for which the signal strength in one of these channels is a maximum.

There are several ways in which this adjustment of the transmission characteristics, during transmission and/or reception (preferably the latter), can be accomplished. Thus, a switchover circuit may alternately block the two channels until its operation is halted, by a controller responsive to the output of a monitoring circuit, in a position in which the more active channel is selected for energization of the load. Another possibility is a periodic phase reversal in one of the branch paths (or complementary phase shifts in both branch paths) to allow the monitoring circuit to ascertain the phasing which yields the highest signal strength in a channel (e.g., the sum channel) permanently connected to the load. In either of these instances the switching rate should be such that the blocking of one channel, or the maintenance of a certain phase shift, endures for a period which is a fraction of the time of illumination of a target by the transmitted radar beam.

According to another feature of my invention, in which the two branch paths include two cascaded 3-db couplers common to both channels, the phase-shifting means — inserted between these couplers — can be operated progressively upon detection of an echo signal in one channel (e.g., the difference channel) to minimize the signal amplitude in that channel while maximizing it in the conjugate channel leading to the load.

Since the two branch paths are merged in both the sum and the difference channel, a modification of the impedance or the phase angle of either channel is tantamount to a change of the transmission characteristics of both branch paths.

BRIEF DESCRIPTION OF THE DRAWING

The above and other features of my invention will be described hereinafter in greater detail with reference to the accompanying drawing in which.

SPECIFIC DESCRIPTION

Figures 1, 2, 3:
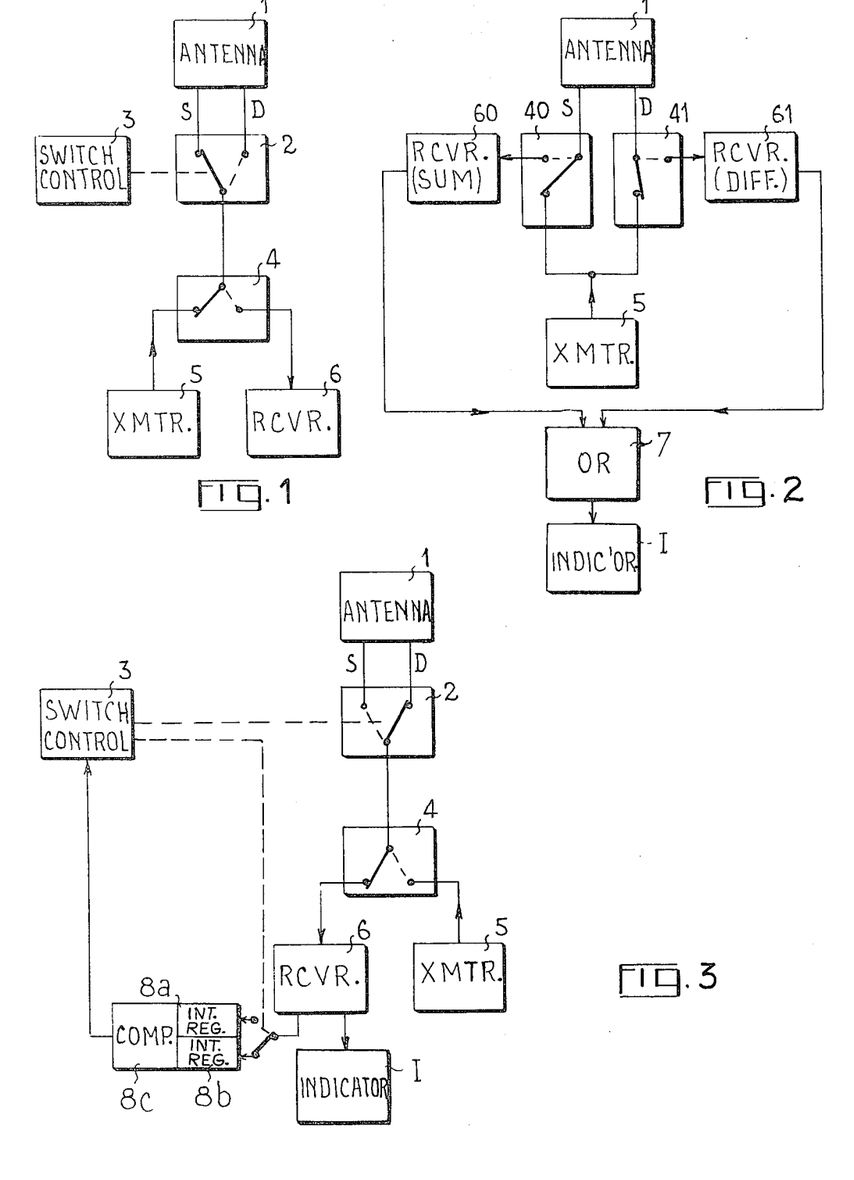
FIG. 1 is an overall block diagram of a system according to the invention, with alternate utilization of an additive and a subtractive channel in both transmission and reception.
FIG. 2 is a block diagram of an embodiment with simultaneous transmission and reception over both channels.
FIG. 3 is a block diagram of a system similar to that of FIG. 1 but with automatic selection of the more effective channel.

The system shown in FIG. 1 comprises an antenna 1, of the type described above and more fully illustrated in FIG. 6, physically or electronically trained upon a region low above the horizon which it sweeps with a progressively varying angle of elevation as is well known per se. The antenna may also be rotated at a relatively slow rate about a vertical axis to scan the entire horizon or a predetermined azimuthal sector.

Figure 6:
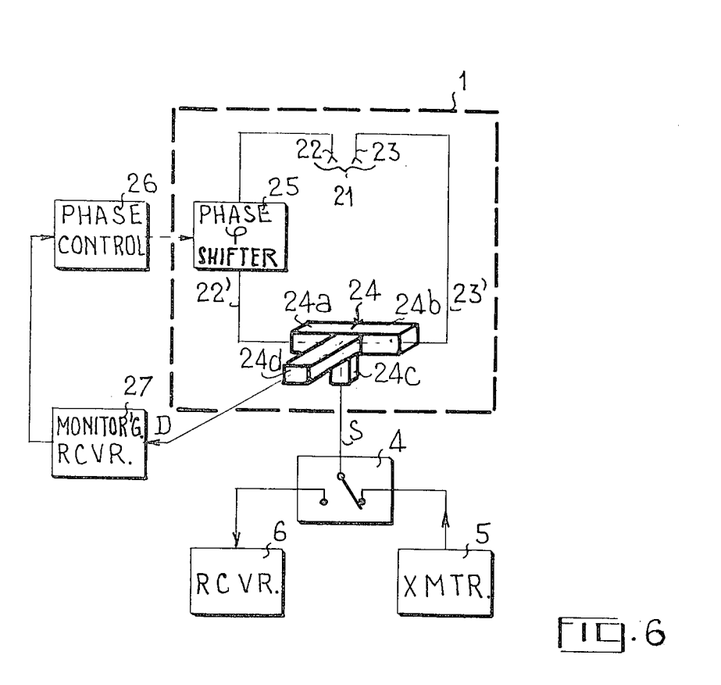
FIG. 6 is a block diagram similar to that of FIG. 5, showing a modification.

The two radiators of the antenna 1 are connected to a switchover stage 2 by way of two parallel channels S (sum) and D (difference) which are connected thereto, e.g., via a Magic-T junction as likewise shown in FIG. 6, in such a way that the energy components intercepted by the two radiators are combined additively on channel S and subtractively on channel D. By virtue of this connection, outgoing microwave energy will be fed to the two radiators via sum channel S for cophasal transmission and via difference channel D for antiphasal transmission. The two channels may be constituted by suitable waveguides; the switchover stage 2, as well as a similar stage 4 in tandem therewith, may comprise conventional electronic means for selectively blocking passage through one or the other waveguide.

Figure 10:
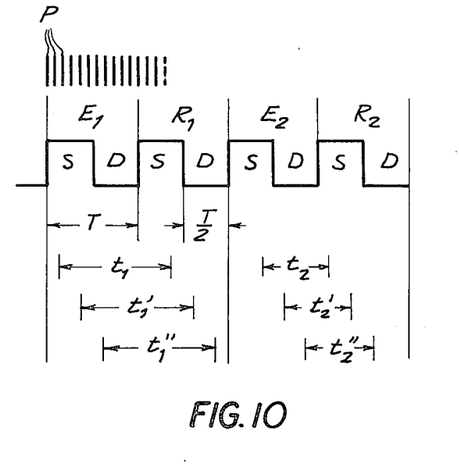
FIG. 10 is a time diagram relating to the operation of the system of FIG. 1.

Switching stage 4 connects stage 2 alternately to a transmitter 5 and a receiver 6. As in a conventional radar system, in which stage 2 is omitted and switch 4 is coupled to antenna 1 directly via channel S, this switch 4 may be periodically reversed by a timer or clock circuit (not shown) effecting a switchover from transmission to reception and vice versa at predetermined intervals T corresponding to the presumed time of illumination, by the transmitted radar beam, of a target to be detected. This has been illustrated in FIG. 10 showing two transmission intervals $E_1$, $E_2$ alternating with two reception intervals $R_1$, $R_2$. A complete switching cycle of stage 4, therefore, has a duration 2T. This illumination time T may encompass a multiplicity of repetition periods of a train of radar pulses P transmitted by antenna 1.

In accordance with my invention, switching stage 2 is operated in timed relationship with stage 4 by means of a control circuit 3 which may form part of the aforementioned clock circuit. Switching stage 2 is periodically reversed at intervals T/2 whereby, as also illustrated in FIG. 10, sum channel S and difference channel D are alternately utilized during each transmission interval and each reception interval.

Consider a signal pulse whose back-and-forth transit time ranges between T and 3T/2. Energy transmitted toward this object in the first quarter of interval $E_1$ is received back, after a time $t_1$, during the second quarter of interval $R_1$. In this instance, transmission and reception take place over the same (additive) channel S. On the other hand, energy radiated toward the same object in the second quarter of interval $E_1$ returns, after a like period $t_1'$, in the third quarter of interval $R_1$, being thus transmitted via channel S and received via conjugate channel D. The first of these two instances represents the conventional method inasmuch as the two radiators of the antenna then act as a single radiator; in the second instance the two energy components undergo a relative phase reversal within the system between transmission and reception. Thus, if the cophasally transmitted energy components yield in-phase echo components, their combined energy will be a maximum in channel S and a minimum in channel D; under these circumstances the incoming signal is strong in the second quarter but weak in the third quarter of interval $R_1$. If, however, the cophasally radiated components generate echoes whose components (as respectively intercepted by the two radiators) return with a relative phase shift of approximately 180°, their combined energy will be a minimum in channel S and a maximum in channel D; thus, the signal would then come in weak during the second quarter and strong during the third quarter of interval $R_1$. Energy emitted in the third quarter of interval $E_1$, via channel D, is received back in the last quarter of interval $R_1$, also by way of channel D, as indicated at $t_1''$ in FIG. 10; this signal will also be strong if the relative phase shift in transit is substantially zero or a multiple of $2\pi$.

An analogous situation exists for reflecting objects whose back-and-forth transit time ranges between T/2 and T. Energy emitted cophasally (via channel S) in the second quarter of interval $E_2$ is received back, after a time $t_2$, in the first quarter of interval $R_2$ by way of channel S; energy radiated antiphasally (via channel D) toward the same object in the third quarter of interval $E_2$ returns in the second quarter of interval $R_2$ after a like period $t_2'$ by way of the conjugate channel S. Again, therefore, the incoming signal may be relatively strong during one part (e.g., the first quarter) of the receiving interval $R_2$ and relatively weak during another part (e.g., the second quarter) of that interval, or vice versa, depending on whether the energy components intercepted by the radiators of antenna 1 are mutually in phase or in phase opposition. It will further be apparent that energy radiated in the last quarter of interval $E_2$ via channel D and returning by way of the same channel after a period $t_2''$, i.e., in the third quarter of interval $R_2$, will also give rise to a strong signal if the relative phase shift during transit is substantially zero (or a multiple of $2\pi$).

The foregoing analysis permits the establishment of certain rules concerning the optimum phasing of the radiated energy components on the basis of comparison of signal strength in different portions of a receiving interval, having regard also to the distance of the reflecting object which may be conventionally determined, for example, by a progressive change in the frequency of the outgoing wave energy.

In FIG. 2 I have shown an alternate embodiment wherein switching stage 2 of FIG. 1 has been omitted while switching stage 4 has been split into two switches 40 and 41 connected to channels S and D, respectively. During emission, these switches connect the transmitter 5 in parallel to the channels S and D feeding a pair of radiators of antenna 1; during reception, these two switches are reversed (under the control of a timer not shown in this Figure) so that channel S leads to a receiver 60 whereas channel D terminates at a receiver 61. The outputs of receivers 60 and 61 are applied through a common OR gate 7 to a common load in the form of a conventional visual indicator I.

In operation, energy components received by the two radiators of antenna 1 (cf. FIG. 6) combine with relatively inverted phasing in channels S and D respectively connected to receivers 60 and 61. Receiver 60 will detect a stronger signal if the radiation pattern of a conventional antenna has a lobe for the particular angle of elevation; if that pattern has a gap at that point, the signal fed to receiver 61 will prevail. In either case, therefore, indicator I will be sufficiently energized.

Because of the partial cancellation of the waves fed to antenna 1 via channels S and D, only one of the radiators of this antenna will be effectively energized during transmission. The system of FIG. 2 may also be modified by omitting the connection from transmitter 5 to one of the switches 40, 41 so that only one of the channels is used during transmission.

FIG. 3 shows the system of FIG. 1 modified by the addition of a further switching stage 8 operated in step with stage 2 by switch control 3. Switch 8 connects an ancillary output of receiver 6 alternately to one of two integrating registers 8a and 8b feeding respective inputs of a comparator 8c. Registers 8a and 8b store the energy arriving over channels S and D, respectively, during the reception intervals established by switch 4. In the absence of reflecting objects, i.e., in a state of surveillance, switches 2 and 8 are periodically reversed at intervals T/2 as described with reference to FIG. 1. If, however, a reflecting object is detected, either or both registers 8a, 8b are energized; if the charges stored in these registers differ significantly, comparator 8c responds and signals the control circuit 3 to freeze the switch 8 and to arrest the switch 2 in a position (not necessarily the same during transmission and reception) in which the ancillary output of receiver 6 goes to the register with the higher charge. If the position of the object changes so that the selected channel is no longer sufficiently energized during reception, the charge stored in the corresponding register disappears and controller 3 reverts to its normal operation.

Figures 4, 5:
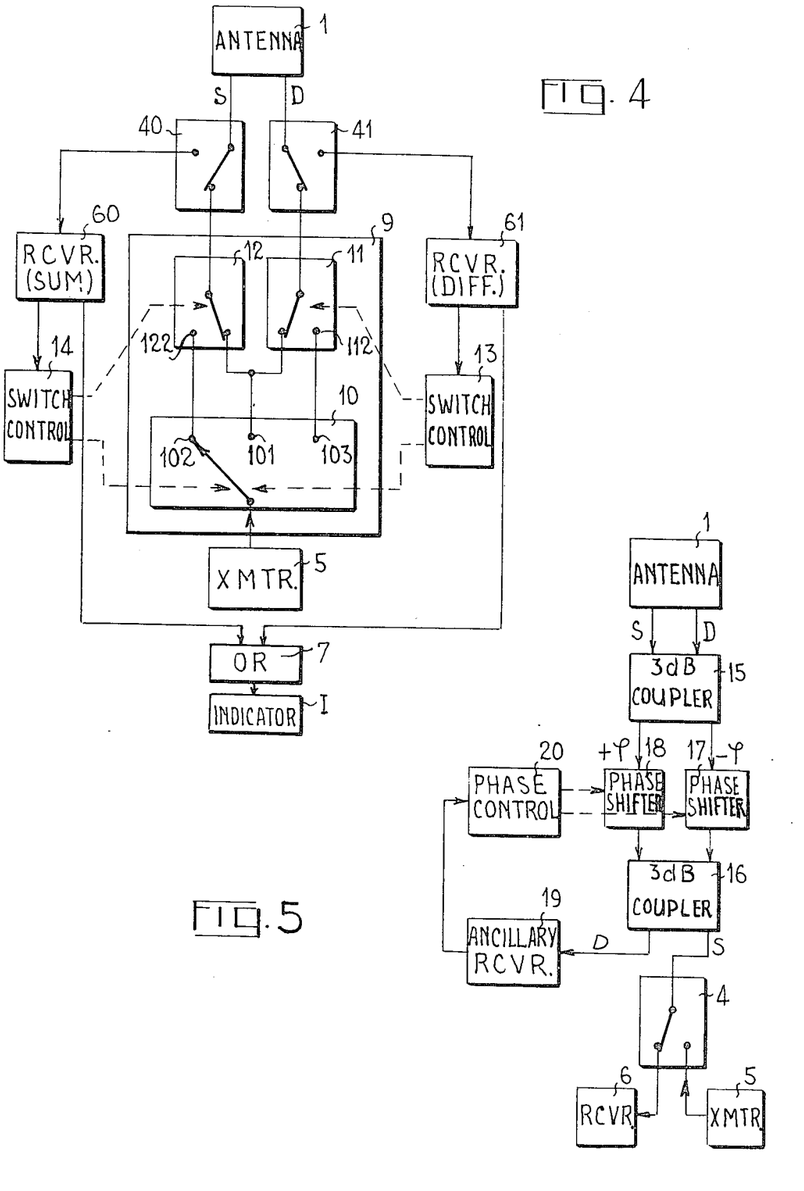
FIG. 4 is a block diagram of a system similar to that of FIG. 2, again with means for selecting the more effective channel.
FIG. 5 is a block diagram of a further embodiment.

FIG. 4 illustrates a similarly autoselective modification of the system shown in FIG. 2. Switches 40 and 41 are connected to transmitter 5 by way of another switching network 9 including two parallel switches 11, 12 in cascade with a common three-position switch 10. It will be understood that, as before, the armatures and bank contacts of these switches are intended to symbolize equivalent electronic circuitry. Switch 10 has three contacts 101, 102, 103, the latter two being connected to contacts 122 and 112, respectively, of switches 12 and 11 whereas contact 101 is connected in parallel to contacts 121 and 111 of these two switches. Ancillary outputs of receivers 60 and 61 work into respective controllers 14 and 13 which jointly set the switch 10 and individually set the switches 12 and 11, respectively.

When the system operates in surveillance, receivers 60 and 61 have no significant output and controllers 13, 14 hold the arm of switch 10 on its middle contact 101. In their position illustrated in FIG. 4, switches 11 and 12 then connect transmitter 5 to antenna 1 via channels D and S in the transmission phase in which the switches 40 and 41 extend these channels to network 9. By a periodic and concurrent reversal of switches 11 and 12, transmission may take place alternately over channels S and D.

With the arm of switch 10 engaging its bank contact 102, channel D is excluded from transmission regardless of the position of switches 11 and 12. The same applies to channel S if the switch arm engages its contact 103. On the basis of the rules mentioned in conjunction with FIG. 10, therefore, controllers 13 and 14 may operate switches 10 – 12 to establish optimum transmitting conditions in response to output signals from receivers 60 and 61. These controllers are advantageously sensitive to substantially lower signal levels than the load I energized by the main receiver outputs.

Switches 10 – 12 may also be operated to transmit simultaneously over channels S and D, as mentioned in conjunction with FIG. 2 and as illustrated in FIG. 4.

In FIG. 5 the antenna 1 is connected to the transmit/receive switch 4 through a pair of cascaded coupling stages 15 and 16 inserted in the two channels S and D, couplers 15 and 16 being of the conventional energy-splitting (3 db) type described, for example, in *Radar Handbook* by Merrill I. Skolnik (McGraw-Hill, Inc. New York, 1970). Inserted in these channels, between the two coupling stages, are a pair of complementary phase shifters 17 and 18 responsive to a controller 20. Coupler 16 also feeds an ancillary or monitoring receiver 19 whose output operates the phase-control circuit 20 to alter the relative phase of the energy components in a sense tending to maximize the combined energy delivered to switch 4 during reception, i.e., to establish a zero output in the section of channel D leading from coupler 16 to receiver 19.

As specifically illustrated in FIG. 5, with the arrows indicating the energy flow during reception, the left-hand input of coupler 15 is part of the sum channel S which continues in the right-hand output of coupler 16 leading to switch 4; with phase shifters 17 and 18 set to introduce zero (or otherwise identical) phase shifts, the signal delivered to channel S by antenna 1 reappears in full strength at switch 4 whereas the signal delivered to difference channel D is fed to monitoring receiver 19, as will be well understood by persons skilled in the art. With a suitable choice of $\phi$, depending upon the relative magnitude and phase of the two signal components, receiver 19 has a null input while the energy supplied to switch 4 is a maximum. Any variation in the setting of the phase shifters affects, of course, both the outgoing and the incoming wave energy.

In FIG. 6 I have shown details of the construction of antenna 1. Two horn radiators 22 and 23 are positioned near the focus of a parabolic reflector 21. These radiators are disposed in a common azimuthal (i.e., vertical) plane adjacent the focus of the reflector and with a relative spacing on the order of magnitude of the diffraction pattern at 3db whereby incoming wave components with different angles of incidence combine with different phasing in their outputs. Radiators 22 and 23 are connected through respective waveguides 22', 23' to opposite lateral branches 24a, 24b of a Magic-T junction 24'; a third branch 24c of this junction, lying with its major faces in the H-plane of main branches 24a and 24b, is electrically connected in parallel to these two branches while a conjugate fourth branch 24d is differentially connected thereto. Branch 24c leads to transmit/receive switch 4 which operates in the manner described with reference to FIG. 1. Branch 24d works into an ancillary or monitoring receiver 27 which in turn influences the setting of a phase shifter 25 in waveguide 22' by means of a control circuit 26. Waveguides 22', 23' form two branch paths leading from radiators 22, 23 to the lateral connections 24a, 24b of Magic T 24.

If the phase shift introduced by circuit 25 in branch path 22' is zero, horns 22 and 23 radiate cophasally during transmission and feed the returning energy components to switch 4 and receiver 6 with whatever relative phase shift they have undergone in transit. Junction 24 additively combines these energy components in branch 24c which therefore constitutes part of the sum channel S of the preceding Figures; if the relative phase shift is substantially equal to $\pi$ or an odd multiple thereof, the signal in channel S is of minimum strength. Under these circumstances, however, the conjugate branch 24d forming part of differential channel D carries a maximum signal amplitude, the monitoring receiver 27 thereupon operating the phase controller 26 to let circuit 25 introduce a phase shift of $\pi$ in the waveguide 221. This relative phase reversal maximizes the signal in channel S and minimizes that in channel D. Phase controller 26 may include a bistable unit to reverse the phase of waveguide 22' in response to any rise in the signal strength on channel D above a predetermined threshold.

It will be understood that the single phase shifter 25 of FIG. 6 could also be replaced by two complementary phase shifters 17, 18 (FIG. 5) in waveguides 22', 23'.

Figure 7:
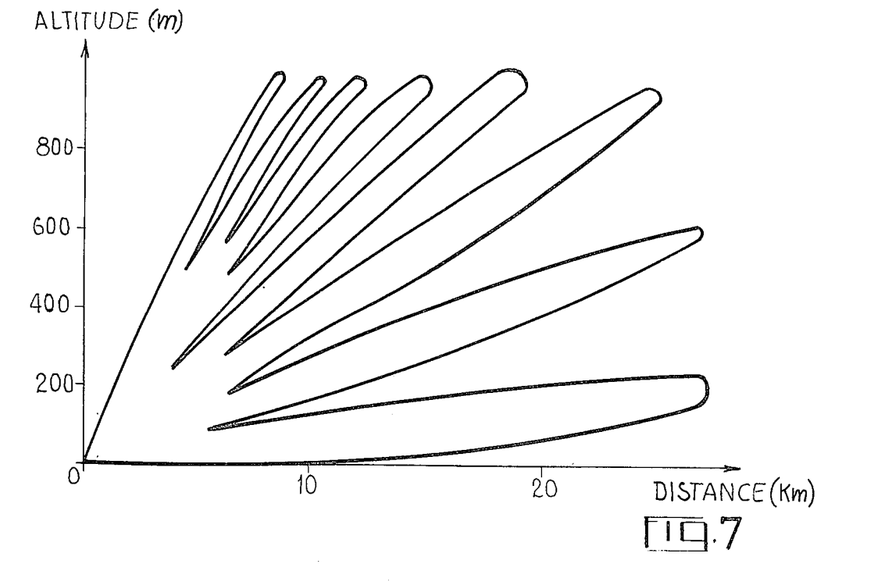
FIG. 7 shows the vertical-plane radiation pattern of a conventional radar used for low-altitude surveillance.

FIG. 7 shows the vertical-plane radiation pattern of a conventional radar system similar to that of FIG. 2 but lacking the channel D and the associated switch 41 and receiver 61. The diagram shows, for angles of elevation corresponding to object altitudes of up to about 1 km, alternating lobes and gaps at distances ranging between roughly 5 and 25 km.

Figure 8:
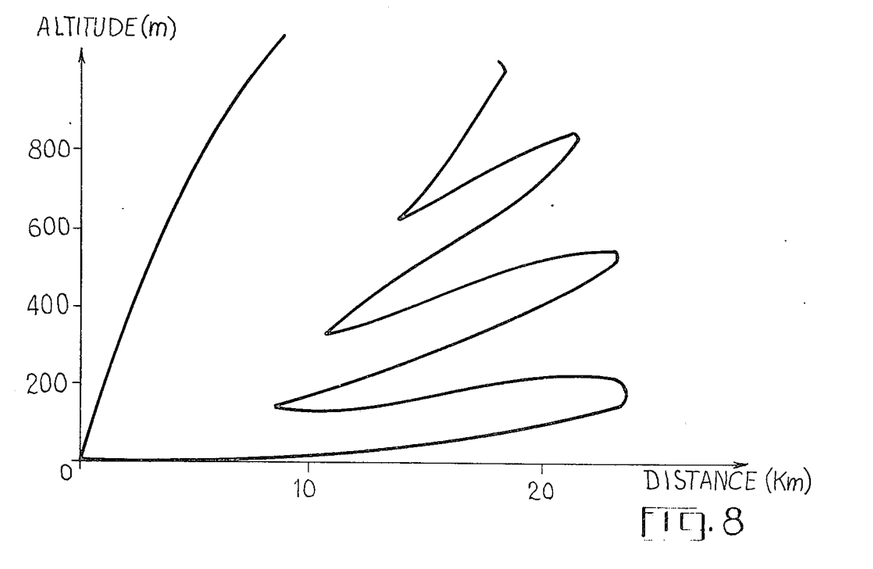
FIG. 8 is a corresponding radiation pattern obtained with my improved system according to the embodiment of FIG. 2.

FIG. 8 illustrates, by way of comparison, the radiation pattern in the same system with the improvement disclosed in FIG. 2; it will be noted that the gaps have been virtually eliminated for distances up to about 10 km and that the number of such gaps for greater distances has been considerably reduced.

Figure 9:
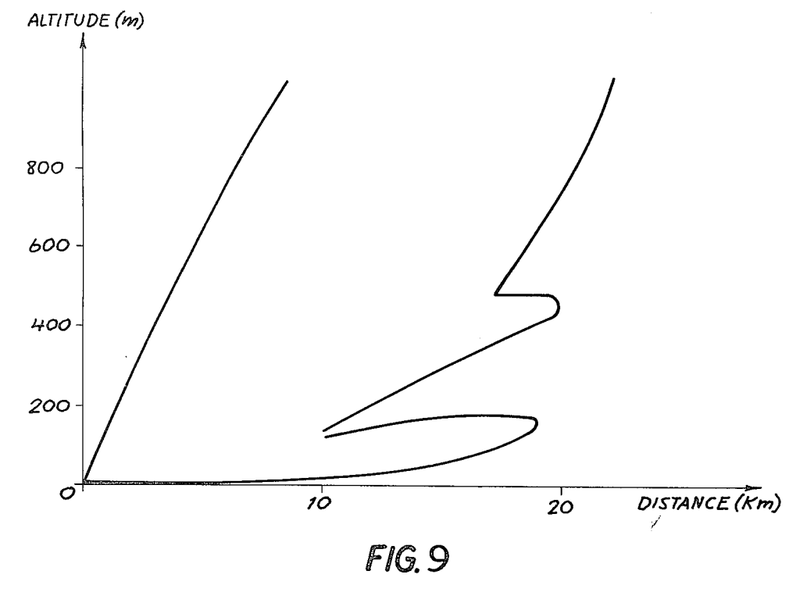
FIG. 9 is a diagram similar to FIG. 8, obtained with a larger antenna.

FIG. 9, finally, shows the radiation pattern for an antenna double the size of that giving rise to the diagram of the two preceding Figures. Except for very low altitudes, this pattern has almost no gaps for distances of up to about 20 km.

The system of FIG. 5 could also operate with the horns 22 and 23 (FIG. 6) connected directly by way of branch paths 22', 23' to the two conjugate upper terminals of coupler 15, without intervention of the Magic T 24. In this case, too, the entire wave energy available during reception at the outputs of both radiators will be delivered to the load energized via receiver 6.

I claim:

1. A method of detecting low-altitude objects with the aid of a radar transceiver provided with antenna means for sending out microwave energy during a transmitting interval and intercepting returning echoes thereof from a reflecting target during a receiving interval, comprising the steps of:

splitting the microwave energy during at least one of said intervals into two separately traveling components by the use of two vertically spaced radiators forming part of said antenna means;

providing two branch paths for the passage of microwave energy between said transceiver and said antenna means, said branch paths merging into a sum channel and a difference channel for additively and subtractively combining said components; and selecting the more strongly energized one of said channels for the energization of a load during said receiving interval.

2. A method as defined in claim 1, comprising the further steps of:

modifying the transmission characteristics of at least one of said branch paths to alter the distribution of incoming microwave energy among said channels;

monitoring the strength of incoming signals due to returning echoes from a single target with different adjustments of said transmission characteristics; and maintaining an adjustment for which the strength of incoming signals in one of said channels is a maximum.

3. A method as defined in claim 2 wherein the modification of said transmission characteristics is accomplished by alternately blocking said channels.

4. A method as defined in claim 2 wherein the modification of said transmission characteristics is accomplished by introduction of a phase shift in at least one of said branch paths.

5. A method as defined in claim 1 wherein the modification of said transmission characteristics is carried out over periods which are a fraction of the time of illumination of a target by a beam of said microwave energy transmitted by said antenna means.

6. A system for detecting low-altitude objects, comprising:

a radar station provided with antenna means for sending out microwave energy during a transmitting interval and intercepting returning echoes thereof from a reflecting target during a receiving interval, said antenna means including two vertically spaced radiators;

transceiver means at said station connected to a source of microwave energy to be transmitted and to a load utilizing incoming signals due to returning echoes;

circuit means at said station forming two branch paths terminating at said radiators for the passage of respective components of microwave energy between said antenna means and said transceiver means, said branch paths merging into a sum channel and a difference channel for additively and subtractively combining said components upon such passage, said circuit means including a pair of cascaded 3-db couplers common to both said branch paths;

coupling means between said branch paths and said transceiver means for passing echo signals from at least the more strongly energized channel to said load during said reception interval;

phase-shifting means inserted between said couplers in at least one of said branch paths for varying the transmission characteristics thereof to alter the distribution of incoming microwave energy among said channels;

monitoring means in said transceiver means for determining the relative strength of incoming signals, due to returning echoes from a single target, in different operating positions of said phase-shifting means; and control means responsive to the output of said monitoring means for maintaining said phase-shifting means in an operating position in which the strength of incoming signals in one of said channels is a maximum.

7. A system as defined in claim 6 wherein said monitoring means is connected to one of said channels, said load being connected to the other of said channels, said control means being responsive to the presence of signals in said one of said channels for actuating said phase-shifting means in a sense minimizing energy transmission from said radiators to said one of said channels while maximizing same in said other of said channels.

* * * * *